Patented Mar. 19, 1940

2,193,831

UNITED STATES PATENT OFFICE 2,193,831

MOISTUREPROOFING

James A. Mitchell, Kenmore, N. Y., assignor to E. I. du Pont de Nemours & Company, Wilmington, Del., a corporation of Delaware No Drawing. Application June 4, 1937,
Serial No. 146,436

35 Claims. (Cl. 91—68)

This invention relates to moistureproofing compositions. More particularly, it relates to those compositions which, when coated onto a base or cast into a self-sustaining film, will produce a material capable of being sealed to itself, to form a substantially rugged and strong joint, by the simple application of heat and pressure.

Recently, there has appeared on the market a moistureproof material which consists of a base of regenerated cellulose thinly coated on both sides thereof with a moistureproofing composition comprising, in its preferred form, nitrocellulose, a blending agent such as a gum or resin, a plasticizer and a moistureproofing agent such as paraffin. This material, which is fully disclosed in U. S. Patent No. 1,737,187, in addition to being moistureproof, is glass clear in transparency, possesses marked flexibility and good surface slip. By virtue of these characteristics, the product has attained widespread and extensive use as a wrapping tissue, particularly in the packaging of materials which are desired to be exhibited to view and which are subject to deterioration by gain or loss of moisture.

The effectiveness of the use of the aforementioned material as a wrapping tissue for products susceptible to change in their original moisture content is dependent to a great extent on the strength of the joint or closure constituting the seal of the wrapper. When the seal or closure was made by the so-called solvent sealing processes, which contemplated applying a solvent such as acetone or methyl ether of ethylene glycol to at least one of the juxtaposed surfaces prior to uniting or joining the same by pressure, there was produced a seal which was quite effective. However, as the use of this material progressed in the packaging accomplished by packaging machines, it was desirable and advantageous to seal or join the material by the use of heat and pressure alone. The product of U. S. Patent No. 1,737,187 above mentioned, upon the application of heat and pressure alone, formed a joint or closure which was very much weaker than that secured by the aforementioned method of solvent sealing. In U. S. Patent No. 1,997,583, it is disclosed that heat seal bonds of considerable strength may be obtained by the use of coating compositions comprising a pyroxylin having certain characteristics, a wax, a plasticizer, and preferably a blending agent.

It is an object of this invention to provide a moistureproofing composition which will deposit a moistureproof, transparent and flexible coating or film having good surface characteristics, said coating or film being capable of being sealed to itself by the simple operation of applying heat and pressure to produce a joint, seal or closure which is materially stronger than a joint of the same dimensions produced by heat sealing analogous moistureproof, transparent and flexible films or coatings of the same thickness.

Another object of this invention is to provide a transparent, moistureproof and flexible material having good surface characteristics, especially suitable for use as a wrapping tissue and which can be heat sealed to produce a joint, seam or closure which is stronger than that secured when the same material is solvent sealed with acetone to produce a joint of the same size.

Other objects will appear hereinafter.

The objects of this invention are accomplished, in general, by providing a moistureproofing composition comprising nitrocellulose, an organic cellulose derivative taken from the class consisting of cellulose esters of higher fatty acids and cellulose ethers, a moistureproofing agent, and a plasticizer in a suitable solvent or mixture of solvents. If desired, a blending agent may also be added. Such a composition when cast or coated on to a base and the solvents evaporated at an elevated temperature, yields a self-sustaining film or coating which is moistureproof, flexible, transparent, heat sealable and has a good surface slip.

As the nitrocellulose, it is preferred to employ a nitrocellulose which can be well plasticized by plasticizers at slightly elevated temperatures. It is also preferred to use such a nitrocellulose as will tolerate a relatively large amount of plasticizer without becoming tacky especially when the sheets of the final product are dried and stacked. Satisfactory results have been secured when a nitrocellulose having a nitrogen content between 10.5% and 12.5% is employed and preferably between 10.5% and 11.6%. In general, the lower the nitrogen content of the nitrocellulose in the range just mentioned, the greater the tolerance for plasticizers. Insofar as the viscosity is concerned, it is preferred to use a nitrocellulose having a Hercules viscosity of 3 to 14 seconds although nitrocellulose of the above-mentioned type having greater or lesser viscosities may be successfully employed. Nitrocelluloses modified with other groups may be used, provided the major portion of the modifying groups is nitrate.

For the organic cellulose derivative there may be used cellulose ethers or cellulose esters of higher fatty acids, or mixed ethers, mixed esters or ether-esters. By higher fatty acids is meant those having at least 5 carbon atoms in the molecule. In the case of mixed esters or ether-esters, the percentage of ether and/or higher ester groups must comprise at least a major portion of the total ether and ester groups. Examples of suitable cellulose ethers are methyl cellulose, ethyl cellulose, propyl cellulose, butyl cellulose, benzyl cellulose, isopropyl cellulose, isobutyl cellulose, methyl-ethyl cellulose and methyl-propyl cellulose. Examples of suitable cellulose esters are cellulose acetate-stearate, cellulose caproate, and cellulose palmitate. The organic cellulose derivative in general should be of the type soluble in organic solvents and particularly in the organic solvent mixtures employed.

The nitrocellulose and organic cellulose derivative taken together constitute the film-forming part of the composition and will be referred to hereinafter as total cellulose derivatives. The ratio of nitro cellulose to organic cellulose derivative in the composition is such that the desired improvement in heat-sealability is secured. In general a great improvement in heat-sealability is obtainable with the admixture of only very small quantities of organic cellulose derivatives. On the other hand, after a certain maximum heat-sealability is attained, a further increase in the amount of organic cellulose derivative and a corresponding reduction in the amount of nitrocellulose will not produce a continued improvement in heat-sealability. For example, as the amount of organic cellulose derivative approaches 100% of the total cellulose derivative present and the nitrocellulose correspondingly approaches zero, the heat-sealability of the resulting product, as hereinafter pointed out, will tend to decrease and will be no greater than that of nitrocellulose alone. Inasmuch as nitrocellulose is a much cheaper and more plentiful product than the cellulose esters and ethers mentioned, it is preferable to use only small quantities of the organic cellulose derivative to obtain the desired heat-sealability. For example, quantities as low as 4% organic cellulose derivatives based on the weight of total cellulose derivatives present have been found to produce very good heat-sealability. In general, it is preferred to use between 4 and 50% organic cellulose derivative based on the weight of the total cellulose derivative present, and especially between 20 and 50%.

For the plasticizer it is preferred to use a solvent softener which will well plasticize both the nitrocellulose and the other cellulose derivative. It is also preferred to use one which does not contribute an odor, taste or color to the final film and which can be used in relatively large quantities and produce a satisfactory surface. Several illustrative examples may include dibutyl phthalate, dicyclohexy phthalate, benzyl butyl phthalate, butyl benzyl benzoate, cyclohexyl butyl phthalate, dicyclohexyl adipate, triphenyl phosphate, tricresyl phosphate, etc., or mixtures of these and/or similar materials.

The proportion of plasticizer to be used naturally varies with the plasticizer and the cellulose derivatives. By this is meant that a plasticizer which is a very good solvent for the cellulose derivative will be used in lesser amounts, especially when an easily plasticizable material is used, and is not required when these conditions are not present. In general, it has been found that quantities of 4–12 parts and preferably 5–8 parts by weight of plasticizer to 10 parts by weight of total cellulose derivative will be useful, depending upon the particular plasticizer and the nitrogen content and solubility of the particular nitrocellulose and organic cellulose derivative.

As the moistureproofing agent, it has been found preferable to use a wax or wax-like substance and particularly one of rather high melting point. Paraffin waxes of higher or lower melting points may be used, depending upon the degree of moistureproofness and/or surface characteristics desired. Other waxes such as palm wax, candelilla wax, ceresin, beeswax, purified shellac wax, or mixtures of waxes may be employed. Other materials such as described and claimed in copending applications to Charch, Brubaker and Meigs, Serial No. 758,652 and Nos. 758,654 to 758,661, inclusive, filed December 21, 1934, may be used. Satisfactory results are obtained when the moistureproofing agent is present in quantities of 0.1 to 1 part by weight, based on 10 parts by weight of the total cellulose derivative.

In certain embodiments of the invention, to gain the highest degree of compatibility between the several coating ingredients, which is reflected in the transparency and moistureproofness of the final film, it has been found that a small amount of a blending agent is desirable. As a blending agent resins such as dammar, ester gum or the modified rosin described in U. S. patent to Morton No. 2,017,866, as well as similar resins are preferred. However, there may also be used as blending agents, such materials as spermaceti, castor oil phthalate, phthalates of other hydroxy fatty acids and other materials in general characterized by a low melting point and a solubility in both hydrocarbon solvents and hydroxyl-containing solvents and which are compatible in all proportions with molten wax.

It is to be understood that when a resin is employed as a blending agent, it is used in relatively small amounts. When a blending agent is used, about 1–2 parts thereof, based on 10 parts of total cellulose derivative, is preferred although smaller amounts such as even down to 0.1 part to 10 parts of total cellulose derivative may be used, the parts being by weight. Some resins do not materially contribute to the heat sealing properties of the final film while others tend to increase the strength of the bond and still others to decrease it. Where the strength of the bond is decreased by a resin, it is highly desirable to obtain the added strength according to the present invention in order to counteract the effect of the resin.

The film constituents are dissolved in a suitable solvent mixture which naturally will vary with the character and quantity of the film constituents, with the base to be coated (since, naturally, solvents which materially attack or dissolve the base sheet must be avoided), and also with the particular coating process, that is hand or machine, and to a slight degree with the type of machine used. In general, a solvent mixture containing absolute ethyl acetate, toluene and ethyl alcohol will be found to give excellent results. For example, 50–87% and preferably 58% absolute ethyl acetate, 10–50% and preferably 30% toluene, and 3–40% and preferably 12% ethyl alcohol, may be employed.

If desired, to the aforementioned solvent mixtures, small percentages of high boiling solvents such as methyl ether of ethylene glycol, butyl alcohol and isobutyl alcohol may be used to promote clarity. Also, high boiling esters and other hydrocarbons, both aromatic and aliphatic, can be used if desired. In general, however, the lower boiling solvents are preferred because of the greater ease of solvent elimination which affects odor if this is important. It is also to be understood that coloring agents, surface modifying agents such as zinc stearate and the like may also be incorporated in the composition.

The ratio of solids to solvents will, of course, be adjusted to the problem in hand, but a solution containing 8–20% of solids will be found to be generally satisfactory.

The final film constituents are dissolved in any convenient manner in the chosen solvent mixture and thereafter the solution is either cast to form self-sustaining films or coated on to the selected base. For convenience and brevity, the procedure will be described in connection with the coating process.

In accordance with this procedure, the chosen composition is applied to the selected base in any suitable manner such as by immersion, spraying or dipping and after the excess composition has been conveniently removed, substantially all of the solvent is evaporated at an elevated temperature. The temperature is preferably at least equal to the melting point of the wax in the composition. When the base is of the type which loses moisture during the process, such as a sheet or film of regenerated cellulose, the coated film after the evaporation of the solvent may be subjected to a humidifying treatment in a warm atmosphere. This humidifying treatment also serves to remove residual solvents.

As a base there may be used various materials such as cellulosic materials, paper, albuminous materials such as gelatin, agar-agar, casein, films made from rubber derivatives, such as rubber hydrochloride, and the like. In the preferred embodiment of the invention non-porous, non-fibrous, dense, smooth surfaced cellulosic films, for example regenerated cellulose, cellulose esters such as cellulose nitrate and cellulose acetate, or cellulose ethers such as ethyl cellulose, benzyl cellulose or glycol cellulose are employed. As previously explained, solvent adjustment may be necessary depending on the particular base employed.

The composition may be coated on to the base to give a wide range of coating thickness and the degree of heat sealing will increase with a given composition with increased thickness of the coating. For the purposes of this invention and particularly where the ultimate product is to be used as a wrapping tissue the coating thickness may vary from 0.00002" to 0.0005" and preferably about 0.00005" on each side of the base.

A sheet or film of regenerated cellulose having a coating of the thickness mentioned and formed of the composition hereinbefore described is truly heat sealable and will produce a seal which is stronger than that produced when the material is solvent sealed with acetone or when heat sealable bonds are produced from similar compositions not containing cellulose esters of five or more carbon atoms in the radical, or cellulose ethers. As a matter of fact, the seal is at least as strong as that produced when the material is solvent sealed with methyl ether of ethylene glycol. Additionally, the material is moisture-proof, transparent and flexible and is characterized by a good surface slip. The material, by virtue of its characteristics, is admirably suitable as a wrapping tissue.

It is to be understood that in general these compositions may be cast into self-sustaining films and that the properties described in the paragraph immediately preceding also apply to such films and the products obtained when the other transparent bases are coated.

For the purpose of comparison and definition, the following test has been used to measure the strength of a heat seal bond. Two strips of the coated material, 1½" wide, are superimposed one on the other so that opposite faces of the film are in contact. A seal is made across the width of the material at one end by placing one film on a metal plate heated to 130° C. and rolling thereover a roller ⅝" wide, weighted to 650 grams. The two strips so sealed are opened at the free ends and placed in a stretching device, such as a Suter testing machine, by clipping each end of the sheets in suitable clamps, one of which is fixed while the other is moved away at a constant speed of 12" per minute. The force in grams required to pull the sheets apart is taken as the measure of the heat seal bond strength.

In order to more fully explain the nature of the invention, the following illustrative table of examples is set forth, in which the parts are parts by weight:

Table I

|  | 1-2 | 3 | 4-5-6 | 7 | 8 |
|---|---|---|---|---|---|
| Total cellulose derivatives | 5.40 | 6.84 | 6.12 | 5.40 | 5.28 |
| Dibutyl phthalate |  | 1.80 | 2.16 |  | 2.28 |
| Dicyclohexyl phthalate | 4.80 | 1.80 | 2.16 | 4.80 | 2.28 |
| Modified ester gum |  |  |  |  | 1.80 |
| Modified rosin | 1.44 |  | 1.20 | 1.44 |  |
| Dammar resin, dewaxed |  | 1.20 |  |  |  |
| Paraffin (M. P. 60° C.) | 0.36 | 0.36 | 0.36 | 0.36 | 0.36 |
| Ethyl acetate | 48 | 61 | 61 | 55 | 57 |
| Toluene | 29 | 24 | 24 | 28 | 27 |
| Ethyl alcohol | 11 | 3 | 3 | 5 | 4 |

The modified rosin of the above examples is that described in U. S. patent to Morton, No. 2,017,866. The modified ester gum is that manufactured by Beck, Koller & Co. of Detroit, Michigan, and sold under the trade-name "Beckacite 1110."

The compositions of the above table were tested for strength of heat seal bond with varying ratios of nitrocellulose to organic cellulose derivative. The results are indicated in Table II. In each case, the nitrocellulose used contained 11.0% nitrogen.

Table II

| Example | Organic cellulose derivative | Percent of total cellulose derivative | | Heat Seal strength in grams |
|---|---|---|---|---|
| | | Organic cellulose derivative | Nitrocellulose | |
| 1 | Benzyl cellulose containing approximately 2.5 benzyl groups per C₆H₁₀O₅ residue of the cellulose. | 0 | 100 | 100 |
| | | 4 | 96 | 230 |
| | | 15 | 85 | 260 |
| | | 37 | 63 | 220 |
| | | 52 | 48 | 360 |
| | | 100 | 0 | 95 |
| 2 | Ethyl cellulose containing approximately 2.5 ethyl groups per C₆H₁₀O₅ residue of the cellulose. | 4 | 96 | 155 |
| | | 15 | 85 | 270 |
| | | 37 | 63 | 300 |
| | | 52 | 48 | 200 |
| | | 100 | 0 | 50 |
| 3 | Ethyl cellulose as in Example 2. | 0 | 100 | 43 |
| | | 50 | 50 | 169 |
| | | 100 | 0 | 45 |
| 4 | Methyl-buytl cellulose containing approximately 0.2 methyl groups and 2.5 butyl groups per C₆H₁₀O₅ residue of the cellulose. | 0 | 100 | 60 |
| | | 50 | 50 | 274 |
| | | 100 | 0 | 44 |
| 5 | Cellulose acetate-stearate containing approximately 1 acetyl group and 1 stearyl group per C₆H₁₀O₅ residue of the cellulose. | 50 | 50 | 413 |
| | | 100 | 0 | 129 |
| 6 | Cellulose caproate containing approximately 2.5 caproyl groups per C₆H₁₀O₅ residue of the cellulose. | 50 | 50 | 335 |
| | | 100 | 0 | 11 |
| 7 | "Loryl"-ethyl cellulose containing approximately 1 "Loryl" group and 1 ethyl group per C₆H₁₀O₅ residue of the cellulose. | 0 | 100 | 100 |
| | | 15 | 85 | 165 |
| | | 37 | 63 | 205 |
| | | 52 | 48 | 300 |
| | | 100 | 0 | 65 |
| 8 | Cellulose acetate-stearate as in Example 5. | 0 | 100 | 25 |
| | | 11 | 89 | 55 |
| | | 23 | 77 | 55 |
| | | 34 | 66 | 50 |
| | | 45 | 55 | 85 |

The "Loryl" group of Example 7 is from a material known under the trade-name "Lorol," a mixture of alcohols obtained by saponification and hydrogenation of a selected portion of cocoanut oil fats. It consists chiefly of lauryl alcohol, with a small proportion of higher and lower alcohols.

It is apparent that the compositions herein described are indeed heat sealable and produce strong and rugged joints when heat sealed. As shown in Table II, according to the relative proportions of the cellulose derivatives, heat sealed joints may be obtained which are 10%, 50%, 100% stronger than and even as much as five times as strong as joints obtainable from similar compositions but containing nitrocellulose alone or the organic cellulose derivative alone. The joints are furthermore at least equal in strength to similar seals produced by solvent sealing with methyl ether of ethylene glycol.

For the purposes of this specification and claims, I define moistureproof materials as those which, in the form of continuous, unbroken sheets or films, permit the passage of not more than 690 grams of water vapor per 100 square meters per hour, over a period of 24 hours, at approximately 39.5° C.±0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5 C.±0.5° C. (preferably 39.5° C.±0.25° C.), with a water vapor pressure differential of 50–55 mm. (preferably 53.4±0.7 mm.) of mercury. For convenience, the number of grams of water vapor passed under these conditions may be referred to as "the permeability value". An uncoated sheet of regenerated cellulose having a thickness of approximately 0.0009" will show a permeability value of the order of 6,900.

Since it is obvious that various changes and modifications may be made in the above description without departing from the nature and spirit thereof, this invention is not restricted thereto except as defined in the appended claims.

I claim:

1. A composition comprising a solution in a volatile solvent of 10 parts of a mixture of cellulose derivatives, said cellulose derivatives comprising nitrocellulose and an organic cellulose derivative taken from the class consisting of cellulose esters of higher fatty acids and cellulose ethers, said organic cellulose derivative comprising 4% to 50% of said mixture of cellulose derivatives, 4 to 12 parts of a plasticizer, and 0.1 to 1 part of a moistureproofing agent, said composition depositing upon the evaporation of the solvent a thin, transparent, moistureproof, flexible film having good surface slip and heat-sealable to produce a joint which is stronger than a similar joint produced when said cellulose derivative is solely nitrocellulose or solely said organic cellulose derivative.

2. A composition comprising a solution in a volatile solvent of 10 parts of a mixture of cellulose derivatives, said cellulose derivatives comprising nitrocellulose and an organic cellulose derivative taken from the class consisting of cellulose esters of higher fatty acids and cellulose ethers, said organic cellulose derivative comprising 4% to 50% of said mixture of cellulose derivatives, 5 to 8 parts of a plasticizer, 0 to 2 parts of a blending agent, and 0.1 to 1 part of a moistureproofing agent, said composition depositing upon the evaporation of the solvent a thin, transparent, moistureproof, flexible film having good surface slip and heat-sealable to produce a joint which is stronger than a similar joint produced when said cellulose derivative is solely nitrocellulose or solely said organic cellulose derivative.

3. A composition comprising a solution in a volatile solvent of 10 parts of a mixture of cellulose derivatives, said cellulose derivatives comprising nitrocellulose having a nitrogen content between 10.5% and 12.5% and an organic cellulose derivative taken from the class consisting of cellulose esters of higher fatty acids and cellulose ethers, said organic cellulose derivative comprising 20% to 50% of said mixture of cellulose derivatives, 5 to 8 parts of a plasticizer, 0.1 to 2 parts of a blending agent, and 0.1 to 1 part of a moistureproofing agent, said composition depositing upon the evaporation of the solvent a thin, transparent, moistureproof, flexible film having good surface slip and heat-sealable to produce a joint which is stronger than a similar joint produced when said cellulose derivative is solely nitrocellulose or solely said organic cellulose derivative.

4. A composition comprising 10 parts of a mixture of cellulose derivatives, said cellulose derivatives comprising nitrocellulose having a nitrogen content between 10.5% and 11.6% and an organic cellulose derivative taken from the class consisting of cellulose esters of higher fatty acids and cellulose ethers, said organic cellulose derivative comprising 4 to 50% of said mixture of cellulose derivatives, 4 to 12 parts of a plasticizer, 1 to 2 parts of a blending agent, 0.1 to 1 part of a moistureproofing agent, and a solvent mixture, said composition depositing upon the evaporation of the solvent a thin, transparent, moistureproof, flexible film having good surface slip and heat-sealable to produce a joint which is stronger than a similar joint produced when said cellulose derivative is solely nitrocellulose or solely said organic cellulose derivative.

5. The composition of claim 1, characterized in that said organic cellulose derivative is a cellulose ether.

6. The composition of claim 1, characterized in that the organic cellulose derivative is ethyl cellulose.

7. The composition of claim 1, characterized in that the organic cellulose derivative is benzyl cellulose.

8. The composition of claim 1, characterized in that said organic cellulose derivative is a cellulose ester of a higher fatty acid.

9. The composition of claim 1, characterized in that the said organic cellulose derivative is a cellulose stearate.

10. The composition of claim 1, characterized in that the said organic cellulose derivative is a cellulose acetate-stearate.

11. The composition of claim 2, characterized in that said organic cellulose derivative is a cellulose ether.

12. The composition of claim 2, characterized in that the said organic cellulose derivative is ethyl cellulose.

13. The composition of claim 2, characterized in that the said organic cellulose derivative is benzyl cellulose.

14. The composition of claim 2, characterized in that said organic cellulose derivative is a cellulose ester of a higher fatty acid.

15. The composition of claim 2, characterized in that the said organic cellulose derivative is a cellulose stearate.

16. The composition of claim 2, characterized in that the said organic cellulose derivative is a cellulose acetate-stearate.

17. The composition of claim 3, characterized in that said organic cellulose derivative is a cellulose ether.

18. The composition of claim 3, characterized in that the said organic cellulose derivative is ethyl cellulose.

19. The composition of claim 3, characterized in that the said organic cellulose derivative is benzyl cellulose.

20. The composition of claim 3, characterized in that said organic cellulose derivative is a cellulose ester of a higher fatty acid.

21. The composition of claim 3, characterized in that the said organic cellulose derivative is a cellulose stearate.

22. The composition of claim 3, characterized in that the said organic cellulose derivative is a cellulose acetate-stearate.

23. The composition of claim 4, characterized in that said organic cellulose derivative is a cellulose ether.

24. The composition of claim 4, characterized in that the said organic cellulose derivative is ethyl cellulose.

25. The composition of claim 4, characterized in that the said organic cellulose derivative is benzyl cellulose.

26. The composition of claim 4, characterized in that said organic cellulose derivative is a cellulose ester of a higher fatty acid.

27. The composition of claim 4, characterized in that the said organic cellulose derivative is a cellulose stearate.

28. The composition of claim 4, characterized in that the said organic cellulose derivative is a cellulose acetate-stearate.

29. A wrapping tissue having a transparent, moistureproof, flexible coating consisting of 5.40 parts of ethyl cellulose and nitrocellulose in the ratio of 37 to 63 parts by weight, dicyclohexyl phthalate 4.80 parts, modified rosin 1.44 parts, and paraffin (M. P. 60° C.) 0.36 part.

30. A wrapping tissue having a transparent, moistureproof, flexible coating consisting of 6.12 parts of a cellulose acetate-stearate and cellulose nitrate in the ratio of 50 to 50 parts by weight, dibutyl phthalate 2.16 parts, dicyclohexyl phthalate 2.16 parts, modified rosin 1.20 parts and paraffin (M. P. 60° C.) 0.36 part.

31. A wrapping tissue having a transparent, moistureproof, flexible coating consisting of 5.40 parts of benzyl cellulose and nitrocellulose in the ratio of 52 to 48 parts by weight, dicyclohexyl phthalate 4.80 parts, modified rosin 1.44 parts and paraffin (M. P. 60° C.) 0.36 part.

32. A wrapping tissue comprising a base thinly coated on both sides with a blended composition comprising a mixture of cellulose derivatives, said cellulose derivatives comprising nitrocellulose and an organic cellulose derivative taken from the class consisting of cellulose esters of higher fatty acids and cellulose ethers, said organic cellulose derivative comprising 4% to 50% of said mixture of cellulose derivatives, 4 to 12 parts of a plasticizer, and 0.1 to 1 part of a moistureproofing agent, the ingredients of the coating being present in such proportions as to provide a transparent, moistureproof, flexible coating having good surface slip and heat-sealable to produce a joint which is stronger than a similar joint produced when said cellulose derivative is solely nitrocellulose or solely said organic cellulose derivative.

33. A wrapping tissue comprising a base thinly coated on both sides with a blended composition comprising a mixture of cellulose derivatives, said cellulose derivatives comprising nitrocellulose and an organic cellulose derivative taken from the class consisting of cellulose esters of higher fatty acids and cellulose ethers, said organic cellulose derivative comprising 4% to 50% of said mixture of cellulose derivatives, 5 to 8 parts of a plasticizer, 0 to 2 parts of a blending agent, and 0.1 to 1 part of a moistureproofing agent, the ingredients of the coating being present in such proportions as to provide a transparent, moistureproof, flexible coating having good surface slip and heat-sealable to produce a joint which is stronger than a similar joint produced when said cellulose derivative is solely nitrocellulose or solely said organic cellulose derivative.

34. A wrapping tissue comprising a base thinly coated on both sides with a blended composition comprising a mixture of cellulose derivatives, said cellulose derivatives comprising nitrocellulose having a nitrogen content between 10.5% and 12.5% and an organic cellulose derivative taken from the class consisting of cellulose esters of higher fatty acids and cellulose ethers, said organic cellulose derivative comprising 20% to 50% of said mixture of cellulose derivatives, 5 to 8 parts of a plasticizer, 0.1 to 2 parts of a blending agent, and 0.1 to 1 part of a moistureproofing agent, the composition providing a transparent, moistureproof, flexible coating having good surface slip and heat-sealable to produce a joint which is stronger than a similar joint produced when said cellulose derivative is solely nitrocellulose or solely said organic cellulose derivative.

35. A wrapping tissue comprising a base thinly coated on both sides with a blended composition comprising 10 parts of a mixture of cellulose derivatives, said cellulose derivatives comprising nitrocellulose having a nitrogen content between 10.5% and 11.6% and an organic cellulose derivative taken from the class consisting of cellulose esters of higher fatty acids and cellulose ethers, said organic cellulose derivative comprising 4 to 50% of said mixture of cellulose derivatives, 4 to 12 parts of a plasticizer, 1 to 2 parts of a blending agent, and 0.1 to 1 part of a moisture-proofing agent, said composition providing a transparent, moistureproof, flexible coating having good surface slip and heat-sealable to produce a joint which is stronger than a similar joint produced when said cellulose derivative is solely nitrocellulose or solely said organic cellulose derivative.

JAMES A. MITCHELL.